(12) United States Patent
Vandanapu et al.

(10) Patent No.: US 10,176,262 B2
(45) Date of Patent: Jan. 8, 2019

(54) NAVIGATION SYSTEM WITH SYNTHESIZED SEARCH MECHANISM AND METHOD OF OPERATION THEREOF

(71) Applicant: Telenav, Inc., Sunnyvale, CA (US)

(72) Inventors: Naveen Kumar Vandanapu, Sunnyvale, CA (US); Gregory Stewart Aist, San Mateo, CA (US)

(73) Assignee: Telenav, Inc., Santa Clara, CA (US)

( * ) Notice: Subject to any disclaimer, the term of this patent is extended or adjusted under 35 U.S.C. 154(b) by 0 days.

(21) Appl. No.: 14/711,555

(22) Filed: May 13, 2015

(65) Prior Publication Data
US 2016/0335355 A1    Nov. 17, 2016

(51) Int. Cl.
*G06F 17/30* (2006.01)
*G01C 21/26* (2006.01)
*G01C 21/36* (2006.01)

(52) U.S. Cl.
CPC ....... *G06F 17/30867* (2013.01); *G01C 21/26* (2013.01); *G01C 21/3679* (2013.01); *G06F 17/30873* (2013.01); *G01C 21/3611* (2013.01)

(58) Field of Classification Search
CPC .................................. G06F 17/30867
See application file for complete search history.

(56) References Cited

U.S. PATENT DOCUMENTS

| | | | | |
|---|---|---|---|---|
| 5,926,118 A * | 7/1999 | Hayashida | ............. | G01C 21/34 340/995.21 |
| 7,522,992 B2 * | 4/2009 | Obradovich | .................. | 701/425 |
| 7,890,330 B2 * | 2/2011 | Ozkaragoz | ......... | G01C 21/3629 434/156 |
| 8,374,791 B2 | 2/2013 | Holsinger | | |
| 8,510,032 B2 | 8/2013 | Shen et al. | | |
| 2016/0162584 A1 * | 6/2016 | Seong | ............... | G06F 17/30867 707/706 |

* cited by examiner

*Primary Examiner* — Adam D Tissot
*Assistant Examiner* — Michael A Berns
(74) *Attorney, Agent, or Firm* — Perspectives Law Group, Corp.

(57) ABSTRACT

A navigation system includes a control unit configured to determine an initial search time associated with an initial search query for commencing a navigation search; determine a further search time associated with a further search query for modifying the navigation search; calculate a hiatus between the further search time and the initial search time; generate a synthesized search query based on the initial search query, the further search query, and the hiatus; and a communication interface, coupled to the control unit, configured to communicate the synthesized search query.

20 Claims, 6 Drawing Sheets

NAVIGATION SYSTEM WITH SYNTHESIZED SEARCH MECHANISM AND METHOD OF OPERATION THEREOF

TECHNICAL FIELD

The present invention relates generally to a navigation system, and more particularly to a system with a synthesized search mechanism.

BACKGROUND

Modern portable consumer and industrial electronics, especially client devices such as navigation systems, cellular phones, portable digital assistants, and combination devices, are providing increasing levels of functionality to support modern life including location-based information services. Research and development in the existing technologies can take myriad directions.

As users become more empowered with the growth of portable location-based service devices, new and old paradigms begin to take advantage of this new device space. One existing approach is to provide hands-free navigation assistance including voice activated driving directions, point-of-interest (POI) search, or a combination thereof. However, user interactions with such hands-free navigation systems are often inaccurate and require additional inputs from the user which compromise the usefulness of such hands-free navigation systems for users.

Thus, a need still remains for a navigation system with a synthesized search mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have long been sought but prior developments have not taught or suggested any solutions and, thus, solutions to these problems have long eluded those skilled in the art.

SUMMARY

An embodiment of the present invention provides a navigation system, including a control unit configured to determine an initial search time associated with an initial search query for commencing a navigation search; determine a further search time associated with a further search query for modifying the navigation search; calculate a hiatus between the further search time and the initial search time; generate a synthesized search query based on the initial search query, the further search query, and the hiatus; and a communication interface, coupled to the control unit, configured to communicate the synthesized search query.

An embodiment of the present invention provides a method of operation of a navigation system including determining, with a control unit, an initial search time associated with an initial search query for commencing a navigation search; determining a further search time associated with a further search query for modifying the navigation search; calculating a hiatus between the further search time and the initial search time; generating a synthesized search query based on the initial search query, the further search query, and the hiatus; and communicating, with a communication interface coupled to the control unit, the synthesized search query.

An embodiment of the present invention provides a non-transitory computer readable medium including determining an initial search time associated with an initial search query for commencing a navigation search; determining a further search time associated with a further search query for modifying the navigation search; calculating a hiatus between the further search time and the initial search time; generating a synthesized search query based on the initial search query, the further search query, and the hiatus; and communicating the synthesized search query.

Certain embodiments of the invention have other steps or elements in addition to or in place of those mentioned above. The steps or element will become apparent to those skilled in the art from a reading of the following detailed description when taken with reference to the accompanying drawings.

DETAILED DESCRIPTION

Figure 1:
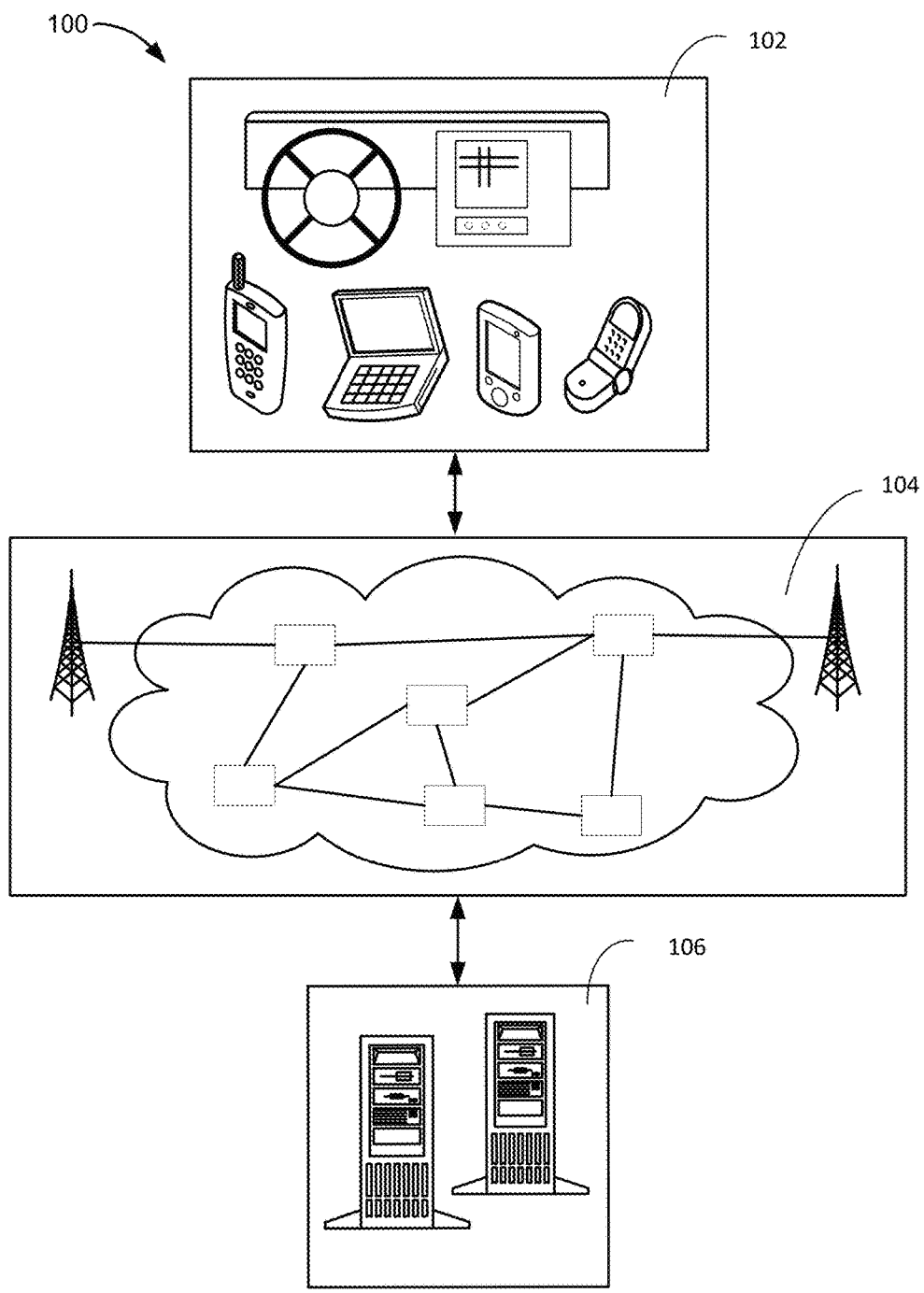
FIG. 1 is a navigation system with a synthesized search mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

One skilled in the art would appreciate that the format with which navigation information is expressed is not critical to some embodiments of the invention. For example, in some embodiments, navigation information is presented in the format of (X, Y), where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to point of interest to the user, such as local business, hours of businesses, types of businesses, advertised specials, traffic information, maps, local events, and nearby community or personal information.

The term "module" referred to herein can include software, hardware, or a combination thereof of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims sections below, the modules are deemed to include hardware circuitry for the purposes and the scope of the apparatus claims.

Referring now to FIG. 1, therein is shown a navigation system 100 with a synthesized search mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or a device incorporated with a vehicle. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or a combination thereof. Satellite communication, cellular communication, BLUETOOTH, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include a direct connection, a personal area network (PAN), a local area network (LAN), a metropolitan area network (MAN), a wide area network (WAN) or any combination thereof.

Figure 2:
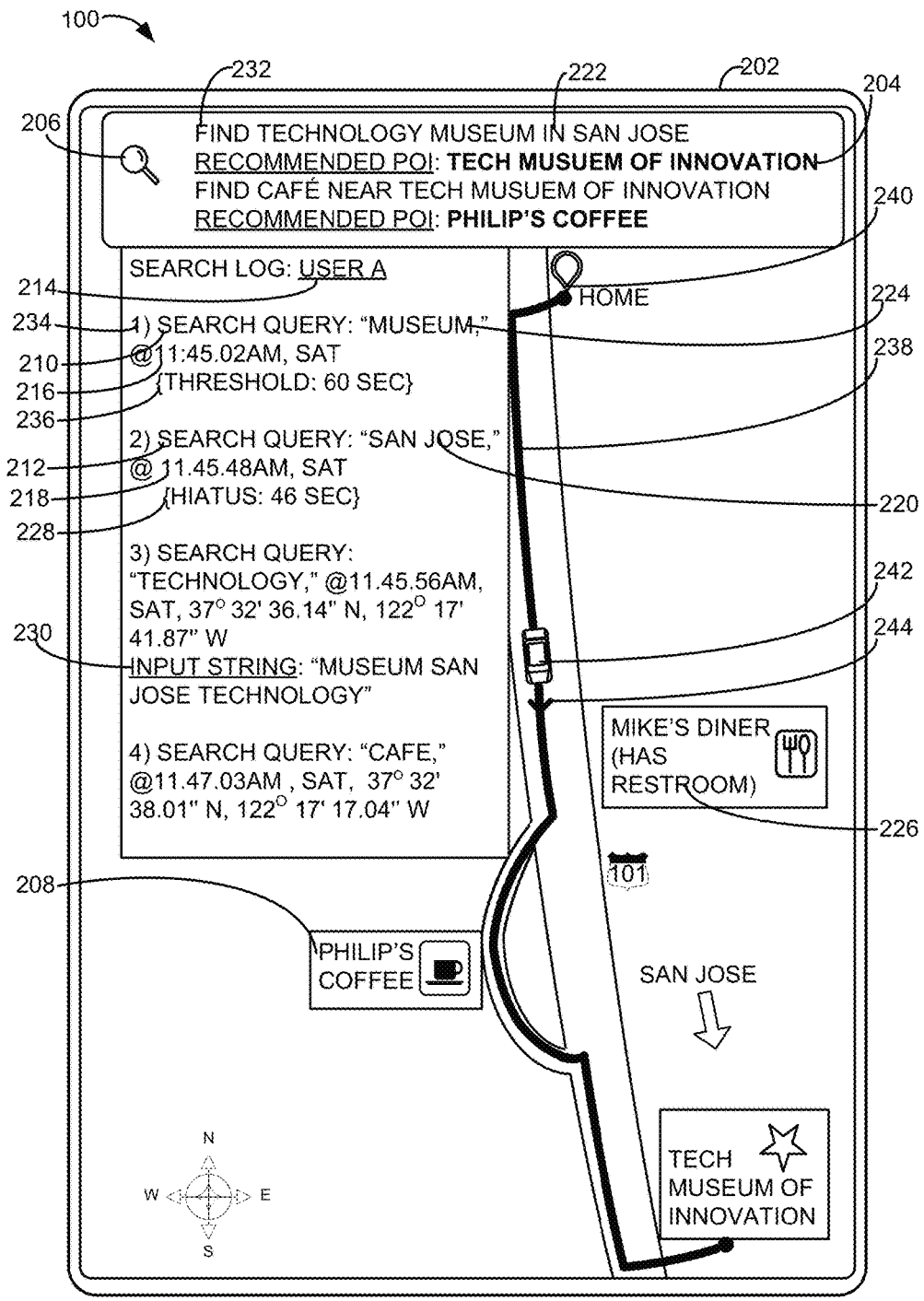
FIG. 2 is an example of a display on a display interface of the navigation system.

Referring now to FIG. 2, therein is shown an example of a display interface 202 of the navigation system 100. The display interface 202 can depict an interest point suggestion 204 resulting from a navigation search 206. The interest point suggestion 204 is a recommendation provided by the navigation system 100 concerning a destination or waypoint.

The interest point suggestion 204 can include a recommendation for one or more interest points 208. The interest points 208 can include dining establishments, fueling stations, landmarks, entertainment venues, lodging establishments, business establishments, sightseeing points, cultural institutions, other points of interest (POIs), or a combination thereof.

The navigation search 206 is a process for determining the interest point suggestion 204. The navigation system 100 can conduct the navigation search 206 based on an initial search query 210, a further search query 212, or a combination thereof. The navigation system 100 can receive the initial search query 210, the further search query 212, or a combination thereof from a user 214 of the navigation system 100 or a device in the navigation system 100. The navigation system 100 can conduct the navigation search 206 using the first device 102 of FIG. 1, the second device 106 of FIG. 1, or a combination thereof.

The initial search query 210 is a keyword or phrase for retrieving information from the navigation system 100. The navigation system 100 can identify the initial search query 210 by receiving the initial search query 210 through a user interface of a device in the navigation system 100. The navigation system 100 can receive the initial search query 210 from a user 214 or a device in the navigation system 100.

The navigation system 100 can receive or retrieve the initial search query 210 through a user interface of the navigation system 100. For example, the initial search query 210 can be an audio query spoken by the user 214 and the navigation system 100 can receive the initial search query 210 through a microphone or audio sensor of the first device 102. Also, for example, the navigation system 100 can receive the initial search query 210 as a character string through an input component of the first device 102 such as a keyboard, a touchscreen, a pin pad, or a combination thereof of the first device 102.

As a more specific example, the user 214 can be driving in an automobile while using a mobile device representing the first device 102 to conduct the navigation search 206. In this example, the navigation system 100 can commence the navigation search 206 when the user 214 vocalizes the initial search query 210.

The initial search query 210 can be made at an initial search time 216. The initial search time 216 is a time recorded by the navigation system 100 when the navigation system 100 identifies the initial search query 210. The further search query 212 is an additional keyword or phrase for retrieving information from the navigation system 100. The further search query 212 can be preceded in time by the initial search query 210.

The navigation system 100 can also identify the further search query 212 by receiving the further search query 212 through the user interface of a device in the navigation system 100. The further search query 212 can also include an audio query, a text query, or a combination thereof.

The further search query 212 can be made at a further search time 218. The further search time 218 is a time recorded by the navigation system 100 when the navigation system 100 identifies the further search query 212.

The initial search query 210, the further search query 212, or a combination thereof can include a geographic identifier 220, a proximity indicator 222, an interest identifier 224, or a combination thereof. The geographic identifier 220 is a name or set of coordinates associated with a geographic region, pathway, or location. The geographic identifier 220 can be the name of a street, a neighborhood, a town, a city, a postal code, a county, or a state.

The proximity indicator 222 is a word or phrase indicating a relation of one geographic location or region with another geographic location or region. The proximity indicator 222 can include the words "near," "in," "at," "next to," "close to," "nearby," or "within."

The interest identifier 224 is a name or designation for a location or an activity associated with the interest point. The interest identifier 224 can include a name, a category, or an event associated with a POI, a landmark, a destination, a waypoint, or a combination thereof.

The initial search query 210, the further search query 212, or a combination thereof can also include an urgent term 226. The urgent term 226 is a word or phrase indicating an exigent circumstance or need of the user 214. The urgent term 226 can include the words "bathroom," "restroom," "gasoline," "rest stop," or a combination thereof.

The navigation system 100 can determine a hiatus 228 between the further search time 218 and the initial search time 216. The hiatus 228 is an elapsed period of time between the initial search query 210 and the further search query 212. The hiatus 228 can be filled by a pause or silence between the initial search query 210 and the further search query 212. The hiatus 228 can also be filled by instructions or commands unrelated to navigation such as an instruction or command associated with a vehicle functionality, another application, or a combination thereof. In addition, the hiatus 228 can be filled by a portion of a conversation between passengers in a mode of transportation. The hiatus 228 can further include the absence of input or stimulus from the user 214.

The navigation system 100 can generate an input search string 230 based on the initial search query 210, the further search query 212, and the hiatus 228. The input search string 230 is a collection of text or characters formed using portions of the initial search query 210, the further search query 212, or a combination thereof. The input search string 230 can be a concatenation or an assemblage of the words or phrases making up the initial search query 210 and the further search query 212.

The navigation system 100 can generate a synthesized search query 232 based on the input search string 230. The synthesized search query 232 is a composite search term or phrase for retrieving data or information from the navigation system 100. The navigation system 100 can generate the synthesized search query 232 based on the initial search query 210, the further search query 212, a portion therein, or a combination thereof.

The navigation system 100 can generate the synthesized search query 232 by changing a sequence 234 of the initial search query 210 and the further search query 212 included in the input search string 230. The sequence 234 refers to a syntax order of the initial search query 210 relative to the further search query 212. The navigation system 100 can change the sequence 234 of the initial search query 210 and the further search query 212 by changing the order of the initial search query 210 and the further search query 212.

For illustrative purposes, the initial search query 210 is depicted as a new set of search terms. However, it should be understood that the navigation system 100 can also use the synthesized search query 232 generated from a previous instance of the navigation search 206 as the initial search query 210.

The navigation system 100 can determine a threshold time 236 for evaluating the hiatus 228. The threshold time 236 is a duration of time representing an upper limit or cap used for evaluating the amount of time elapsed between the initial search time 216 and the further search time 218. The navigation system 100 can compare the hiatus 228 with the threshold time 236 to generate the synthesized search query 232. The navigation system 100 can also dynamically adjust the threshold time 236 based on the initial search query 210.

The display interface 202 can depict one or more navigation routes 238 from a starting location 240 to the interest point suggestion 204. The navigation routes 238 are guidance paths generated by the navigation system 100 for guiding the user 214 to a destination or waypoint. The navigation routes 238 can be displayed on a map graphic as depicted in FIG. 2. The navigation routes 238 can include a driving route, a cycling route, a public transportation route, a pedestrian route, or a combination thereof.

The starting location 240 is a geographic location or set of coordinates representing a commencement point for one or more of the navigation routes 238. The starting location 240 can include a current location 242. The current location 242 is a present geographic position of a device in the navigation system 100. The current location 242 can be the present geographic position of the user 214 when the user 214 is carrying or using the device such as the first device 102, the second device 106, or a combination thereof.

The navigation system 100 can determine the starting location 240, including the current location 242, based on location information received or retrieved from the first device 102, the second device 106, or a combination thereof. The navigation system 100 can also determine the starting location 240, including the current location 242, based on an input from the user 214 or a device coupled to the navigation system 100.

The display interface 202 can also depict a current heading 244 of the user 214 or a device in the navigation system 100. The current heading 244 can include a present or real-time direction of motion of the device. For example, the current heading 244 can include a present or real-time geodetic direction of the first device 102.

For illustrative purposes, the navigation system 100 is described as processing for the user 214. However, it should be understood that the navigation system 100 can also process for the first device 102, the user 214, the second device 106, or a combination thereof.

Figure 3:
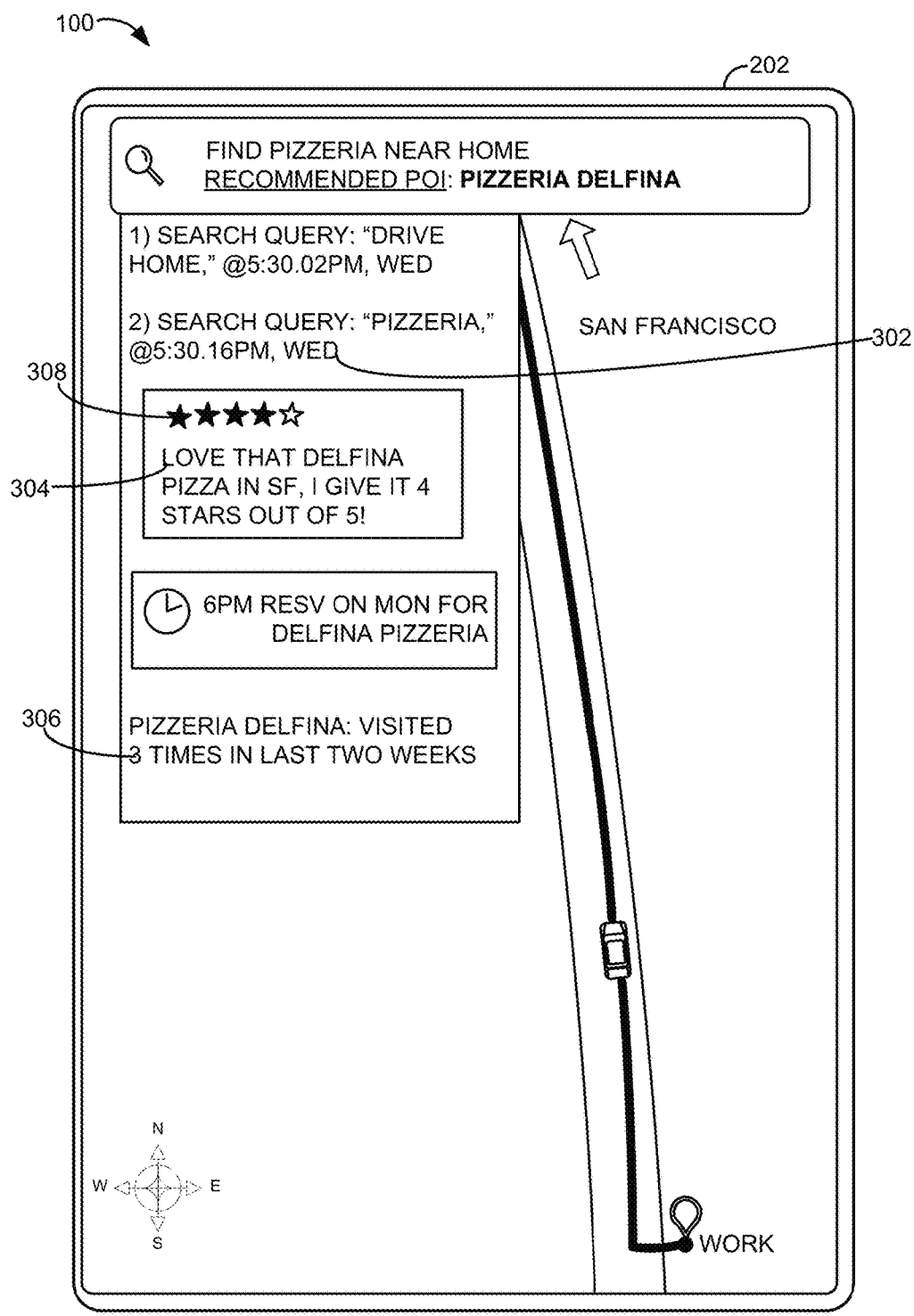
FIG. 3 is an example of another display on the display interface of the navigation system.

Referring now to FIG. 3, therein is shown an example of another display on the display interface 202 of the navigation system 100. The display interface 202 can depict a navigation context 302.

The navigation context 302 is a set of circumstances or conditions surrounding a device when the navigation system 100 identifies the initial search query 210 of FIG. 2, the further search query 212 of FIG. 2, or a combination thereof. The navigation context 302 can include a day-of-the-week, a month, a weather condition, a traffic condition, location information, user's circumstances or conditions, or a combination thereof.

The display interface 202 can also depict a user preference 304. The user preference 304 is a predilection of the user 214 of FIG. 2 for one or more of the interest points 208 of FIG. 2. The navigation system 100 can determine the user preference 304 based on a user profile 308, a travel profile 306, or a combination thereof.

The user profile 308 is data or information concerning the user 214 or content attributed to the user 214. The user profile 308 can include a user identity, a user demographic, a user-generated content, or a combination thereof. For example, the user profile 308 can include a user-generated review posted by the user 214 concerning one of the interest points 208. Also, for example, the user profile 308 can include a credential or vocation of the user 214.

The travel profile 306 is data or information concerning a pattern of travel associated with the user 214 or a device carried by the user 214. The travel profile 306 can include previous routes traversed or previous destinations visited by the user 214. The travel profile 306 can also include the routes frequently traversed by the user 214 or the interest points 208 frequently visited by the user 214.

Figure 4:
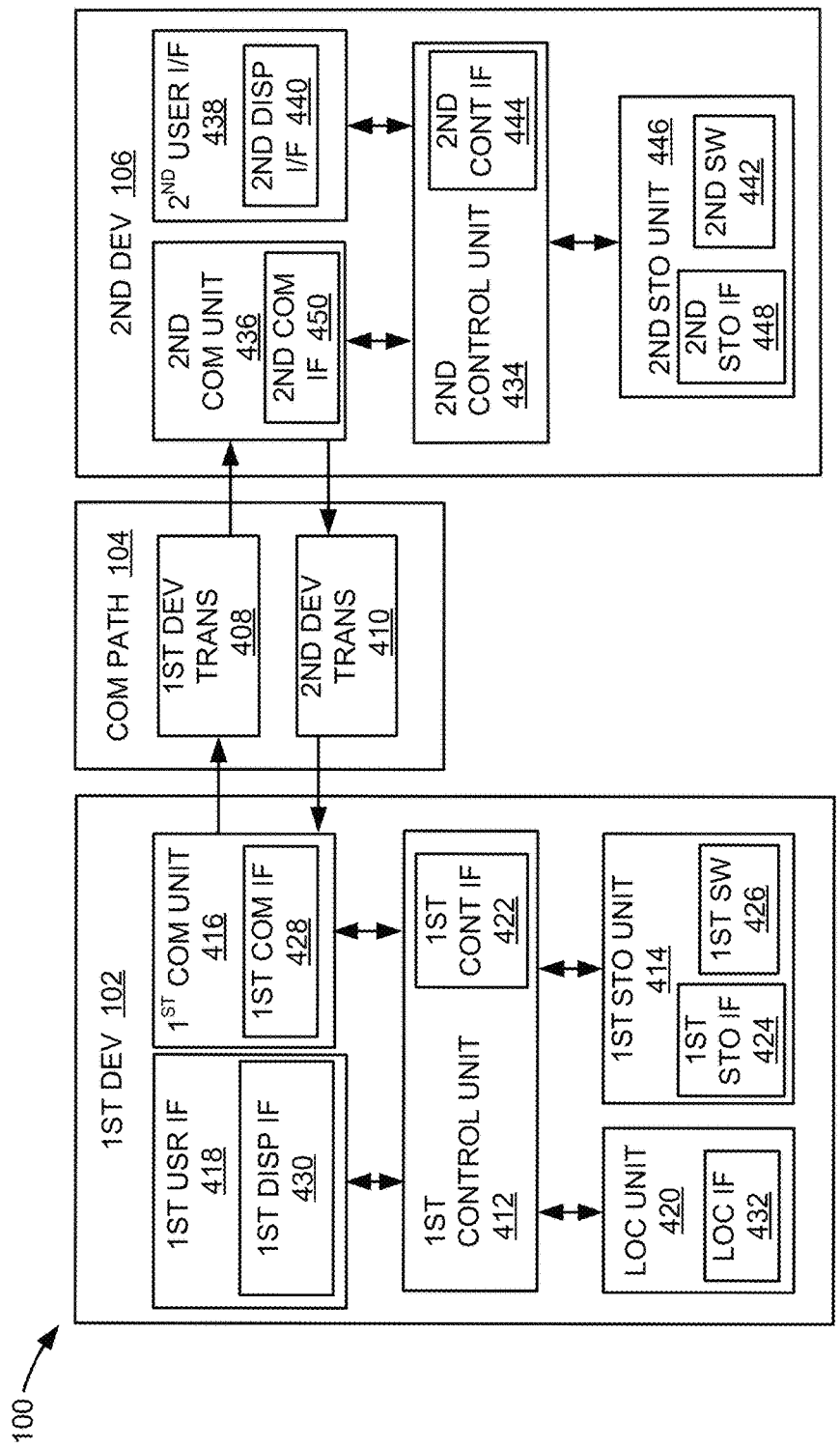
FIG. 4 is an exemplary block diagram of the navigation system.

Referring now to FIG. 4 therein is shown an exemplary block diagram of the navigation system 100. The navigation system 100 can include the first device 102, the communication path 104, and the second device 106. The first device 102 can send information in a first device transmission 408 over the communication path 104 to the second device 106. The second device 106 can send information in a second device transmission 410 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 412, a first storage unit 414, a first communication unit 416, a first user interface 418, and a location unit 420. The first device 102 can be similarly described by the first device 102.

The first control unit 412 can include a first control interface 422. The first control unit 412 can execute a first software 426 to provide the intelligence of the navigation system 100. The first control unit 412 can be implemented in a number of different manners. For example, the first control unit 412 can be a processor, an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The location unit 420 can generate a location or movement information, including a geographic position, a heading, an inertial orientation, a speed, an altitude, or a combination thereof or a change therein of the first device 1002. The location unit 420 can be implemented in many ways.

For example, the location unit 420 can function as at least a part of a global positioning system (GPS), a global navigation satellite system (GLONASS), an inertial navigation system, a cellular-tower location system, a pressure location system, or any combination thereof. The location unit 220 can include an accelerometer, a gyroscope, an airspeed indicator, a compass, a heading indicator, an altimeter, an automatic dependent surveillance-broadcast (ADS-B) transponder, or a combination thereof.

The location unit 420 can include a location interface 432. The location interface 432 can be used for communication between the location unit 420 and other functional units in the first device 102. The location interface 432 can also be used for communication that is external to the first device 102.

The location interface 432 can receive information from the other functional units or from external sources, or can transmit information to the other functional units or to external destinations. The external sources and the external destinations refer to sources and destinations external to the first device 102.

The location interface 432 can include different implementations depending on which functional units or external units are being interfaced with the location unit 420. The location interface 432 can be implemented with technologies and techniques similar to the implementation of the first control interface 422.

The first storage unit 414 can store the first software 426. The first storage unit 414 can also store the relevant information, such as advertisements, point of interest (POI), navigation routing entries, reviews/ratings, feedback, traffic patterns, or any combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a computer desktop, and the communication path 104.

The first communication unit 416 can also function as a communication hub allowing the first device 102 to function as part of the communication path 104 and not limited to be an end point or terminal unit to the communication path 104. The first communication unit 416 can include active and passive components, such as microelectronics or an antenna, for interaction with the communication path 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, or any combination thereof to provide data and communication inputs.

The first user interface 418 can include a first display interface 430, or a combination thereof. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the location unit 420. The first control unit 412 can further execute the first software 426 for interaction with the communication path 104 via the first communication unit 416.

The second device 106 can be optimized for implementing the present invention in a multiple device embodiment with the first device 102. The second device 106 can provide the additional or higher performance processing power compared to the first device 102. The second device 106 can include a second control unit 434, a second communication unit 436, and a second user interface 438.

The second user interface 438 allows the user to interface and interact with the second device 106. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the communication path 104.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 106. The second controller interface 444 can also be used for communication that is external to the second device 106.

The second controller interface 444 can receive information from the other functional units or from external sources, or can transmit information to the other functional units or to external destinations. The external sources and the external destinations refer to sources and destinations external to the second device 106.

The second controller interface 444 can be implemented in different ways and can include different implementations depending on which functional units or external units are being interfaced with the second controller interface 444.

For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POIs), navigation routing entries, reviews/ratings, feedback, traffic patterns, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 106. For example, the second communication unit 436 can permit the second device 106 to communicate with the first device 102 over the communication path 104.

The second communication unit 436 can also function as a communication hub allowing the second device 106 to function as part of the communication path 104 and not limited to be an end point or terminal unit to the communication path 104. The second communication unit 436 can include active and passive components, such as microelectronics or an antenna, for interaction with the communication path 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 104 to send information to the second device 106 in the first device transmission 408. The second device 106 can receive information in the second communication unit 436 from the first device transmission 408 of the communication path 104.

The second communication unit 436 can couple with the communication path 104 to send information to the first device 102 in the second device transmission 410. The first device 102 can receive information in the first communication unit 416 from the second device transmission 410 of the communication path 104. The navigation system 100 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 420, although it is understood that the second device 106 can also operate the location unit 420.

Figure 5:
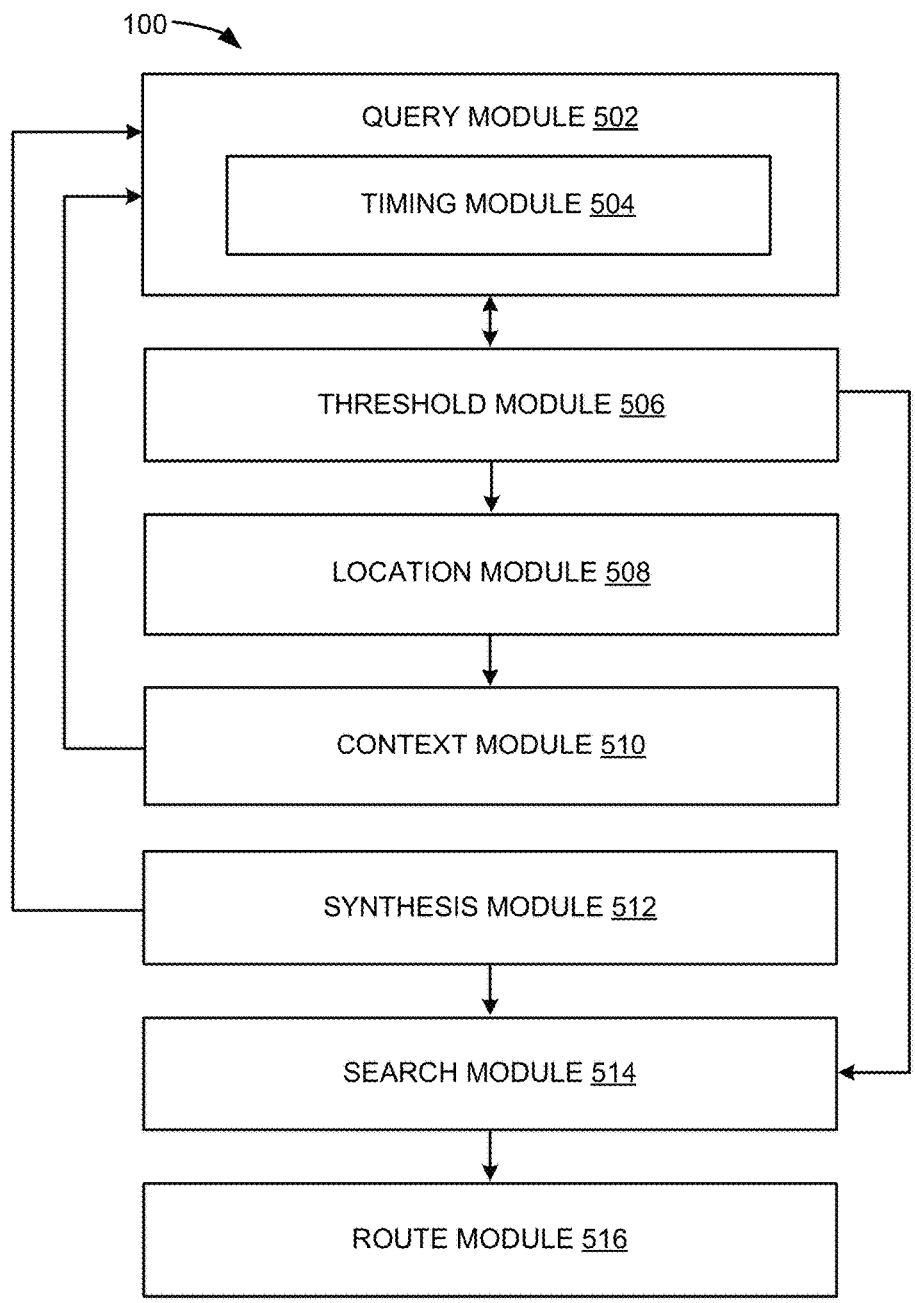
FIG. 5 is a control flow of the navigation system.

Referring now to FIG. 5, therein is shown a control flow of the navigation system 100 with a synthesized search mechanism. The navigation system 100 can include a query module 502, a threshold module 506, a location module 508, a context module 510, a synthesis module 512, a search module 514, a route module 516, or a combination thereof.

The query module 502 can be coupled to the threshold module 506. The threshold module 506 can be further coupled to the location module 508, the location module 508 can be further coupled to the context module 510, the context module 510 can be further coupled to the synthesis module 512, the synthesis module 512 can be further coupled to the search module 514, and the search module 514 can be further coupled to the route module 516.

The modules can be coupled by having the input of one module connected to the output of another module as shown in FIG. 5. The modules can be coupled by using wired or wireless connections, the communication path 104 of FIG. 1, instructional steps, or a combination thereof. The modules can be coupled directly, without any intervening structures other than the structure providing the direct connection. The modules can further be coupled indirectly, through a shared connection or other functional structures between the coupled modules.

The query module 502 is configured to identify the initial search query 210 of FIG. 2, the further search query 212 of FIG. 2, or a combination thereof. The query module 502 can identify the initial search query 210 for commencing the navigation search 206 of FIG. 2. The query module 502 can also identify the further search query 212 for potentially modifying the navigation search 206.

The query module 502 can identify the initial search query 210, the further search query 212, or a combination thereof when the navigation system 100 receives or retrieves the initial search query 210, the further search query 212, or a combination thereof from the user 214 of FIG. 2 or a device in the navigation system 100. The query module 502 can use the first user interface 418 of FIG. 4, the second user interface 438 of FIG. 4, the first communication interface 428 of FIG. 4, the second communication interface 450 of FIG. 4, or a combination thereof to receive or retrieve the initial search query 210, the further search query 212, or a combination thereof.

For example, the query module 502 can identify the initial search query 210 when a microphone of the first device 102 of FIG. 1 receives a word or phrase directed at the first device 102 from the user 214 of FIG. 2. Also, for example, the query module 502 can identify the initial search query 210 when the second communication interface 250 of the second device 106 of FIG. 1 receives the initial search query 210 from the first device 102.

The query module 502 can identify the initial search query 210, the further search query 212, or a combination thereof by identifying the geographic identifier 220 of FIG. 2, the proximity indicator 222 of FIG. 2, the interest identifier 224 of FIG. 2, or a combination thereof from the initial search query 210, the further search query 212, or a combination thereof. The query module 502 can identify the geographic identifier 220 by comparing one or more words or numbers of the initial search query 210, the further search query 212, or a combination thereof with a set of known geographic names or markers from a map database such as a GIS database, a Geographic Names Information System (GNIS) database, GEONAMES database, a postal code database, or a combination thereof.

The query module 502 can identify the proximity indicator 222 by comparing one or more words of the initial search query 210, the further search query 212, or a combination thereof with a list of known proximity terms or phrases. The list of known proximity terms or phrases can be predetermined by the navigation system 100, received from a device coupled to the navigation system 100, or retrieved from an online database.

For example, the list of known proximity terms or phrases can include "near," "in," "at," "next to," "close to," "nearby," or "within." In addition, the query module 502 can use a natural language training technique including a part-of-speech training model to identify the proximity indicator 222 from the initial search query 210, the further search query 212, or a combination thereof.

The query module 502 can identify the interest identifier 224 from the initial search query 210, the further search query 212, or a combination thereof by removing or filtering out the proximity indicator 222 and the geographic identifier 220 from the initial search query 210, the further search query 212, or a combination thereof. The query module 502 can then identify the interest identifier 224 by comparing any remaining words, numbers, or phrases of the initial search query 210, the further search query 212, or a combination thereof with a set of known names or street numbers from a map database, a POI database, a POI feed, or a combination thereof.

The query module 502 can also identify the initial search query 210, the further search query 212, or a combination thereof by identifying the urgent term 226 of FIG. 2 in the initial search query 210, the further search query 212, or a combination thereof. The query module 502 can identify the urgent term 226 by comparing one or more words, phrases, or acronyms of the initial search query 210, the further search query 212, or a combination thereof with a list of known words, phrases, or acronyms predetermined as the urgent term 226. For example, the urgent term 226 can include the word or phrase "bathroom," "restroom," "gasoline," "rest stop," or a combination thereof.

The query module 502 can also include a timing module 504. The timing module 504 is configured to determine the initial search time 216 of FIG. 2 associated with the initial search query 210, the further search time 218 of FIG. 2 associated with the further search query 212, or a combination thereof. In addition, the timing module 504 is also configured to calculate the hiatus 228 of FIG. 2 based on the further search time 218 and the initial search time 216.

The timing module 504 can determine the initial search time 216 by tagging or labeling the initial search query 210 with a timestamp when the navigation system 100 receives or retrieves the initial search query 210. The timing module 504 can determine the further search time 218 by tagging or labeling the further search query 212 with a timestamp when the navigation system 100 receives or retrieves the further search query 212.

The timestamp can indicate when the first byte of audio sample was generated in each query instead of signaling when the search query was received by navigation system 100. The timing module 504 can use the timestamp as the time of first audio byte to avoid jitter based on timing variations between when the signal was generated and when it was received by 100. The timing module 504 can calculate the hiatus 228 by calculating the time elapsed between the further search time 218 and the initial search time 216.

The timing module 504 can store the initial search time 216, the further search time 218, the hiatus 228, or a combination thereof in the first storage unit 414 of FIG. 4, the second storage unit 446 of FIG. 4, or a combination thereof. In addition, the query module 502 can store the geographic identifier 220, the proximity indicator 222, the interest identifier 224, the urgent term 226, or a combination thereof in the first storage unit 414, the second storage unit 446, or a combination thereof.

The query module 502 can be part of the first software 426 of FIG. 4, the second software 442 of FIG. 4, or a combination thereof. The first control unit 412 of FIG. 4 can execute the first software 426, the second control unit 434 of FIG. 4 can execute the second software 442, or a combination thereof to identify the initial search query 210 and the further search query 212, determine the initial search time 216 and the further search time 218, and calculate the hiatus 228 between the further search time 218 and the initial search time 216.

Moreover, the query module 502 can also communicate the initial search query 210, the further search query 212, the initial search time 216, the further search time 218, and the hiatus 228 between devices through the first communication unit 416, the second communication unit 436, or a combination thereof. After identifying the initial search query 210 and the further search query 212, determining the initial search time 216 and the further search time 218, and calculating the hiatus 228 between the further search time 218 and the initial search time 216, the control flow can pass from the query module 502 to the threshold module 506.

The threshold module 506 is configured to determine the threshold time 236 of FIG. 2 and generate the input search string 230 of FIG. 2. The threshold module 506 can determine the threshold time 236 for evaluating the hiatus 228 between the further search time 218 and the initial search time 216.

The threshold module 506 can determine the threshold time 236 based on the initial search query 210. More specifically, the threshold module 506 can determine the threshold time 236 based on the geographic identifier 220 and the interest identifier 224 included in the initial search query 210. The threshold module 506 can determine a duration of the threshold time 236 based on a size of the geographic region associated with the geographic identifier 220. In addition, the threshold module 506 can determine the duration of the threshold time 236 based on a governmental designation of the geographic identifier 220. Moreover, the threshold module 506 can also determine the duration of the threshold time 236 based on the specificity of the interest identifier 224.

The threshold module 506 can determine the threshold time 236 by setting a default instance of the threshold time 236. For example, the default instance of the threshold time 236 can range from less than one second to multiple minutes. As a more specific example, the default instance of the threshold time 236 can be 30 seconds. The default instance of the threshold time 236 can be predetermined by the navigation system 100.

The threshold module 506 can adjust the duration of the default instance of the threshold time 236 based on the size of the geographic region associated with the geographic identifier 220, the governmental designation of the geographic identifier 220, and the specificity of the interest identifier 224. The threshold module 506 can increase the default instance of the threshold time 236 when the size of the geographic region associated with the geographic identifier 220 exceeds a size threshold. In addition, the threshold module 506 can increase the default instance of the threshold time 236 when the governmental designation of the geographic identifier 220 is equivalent to or higher than a township such as a city, a county, or a state.

The threshold module 506 can also adjust the default instance of the threshold time 236 based on a specificity of the interest identifier 224. The threshold module 506 can decrease the default instance of the threshold time 236 when the interest identifier 224 is an exact name or coordinates of one of the interest points 208. In addition, the threshold module 506 can increase the default instance of the threshold time 236 when the interest identifier 224 is a generic identifier such as a POI category, a cuisine category, an event category, or a combination thereof.

For example, the threshold module 506 can decrease the default instance of the threshold time 236 when the initial search query 210 includes the exact name or coordinates of a restaurant, a store, a venue, a sightseeing destination, or a combination thereof. Also, for example, the threshold module 506 can increase the default instance of the threshold time 236 when the initial search query 210 includes a cuisine category such as "Italian food" or "Chinese food" or a POI category such as "coffee shop" or "grocery store."

The threshold module 506 can dynamically determine the threshold time 236. The threshold module 506 can dynamically determine the threshold time 236 based on a pattern, a preference, or a combination thereof specific to individual instance of the user 214.

After determining the threshold time 236, the threshold module 506 can generate the input search string 230 based on the initial search query 210, the further search query 212, the hiatus 228, the threshold time 236, or a combination thereof. The threshold module 506 can generate the input search string 230 for providing the inputs needed to generate the synthesized search query 232 of FIG. 2.

The threshold module 506 can generate the input search string 230 by including the initial search query 210 in the input search string 230. The threshold module 506 can then generate the input search string 230 by comparing the hiatus 228 with the threshold time 236.

The threshold module 506 can include the further search query 212 as part of the input search string 230 when the hiatus 228 is equal to or less than the threshold time 236. The threshold module 506 can include the further search query 212 as part of the input search string 230 by concatenating or combining words or phrases from the further search query 212 with the initial search query 210.

In addition, the threshold module 506 can exclude the further search query 212 from the input search string 230 when the hiatus 228 exceeds the threshold time 236. By excluding the further search query 212 from the input search string 230, the navigation system 100 can conduct the navigation search 206 with only the initial search query 210 and treat the further search query 212 as a new instance of the initial search query 210 for a subsequent instance of the navigation search 206.

After generating the input search string 230, the threshold module 506 can pass the control flow directly to the search module 514 when the input search string 230 does not include the further search query 212. The threshold module 506 can pass the control flow directly to the search module 514 to generate the interest point suggestion 204 of FIG. 2 based on the initial search query 210.

Moreover, the threshold module 506 can also pass the control flow back to the query module 502 when the input search string 230 does not include the further search query 212. By doing so, the query module 502 can identify the previous instance of the further search query 212 as a new instance of the initial search query 210. In addition, the query module 502 can identify any subsequent search queries detected as a new instance of the further search query 212. The threshold module 506 can pass the control flow to the query module 502, the search module 514, or a combination thereof when the hiatus 228 exceeds the threshold time 236.

In addition, the threshold module 506 can pass the control flow to the location module 508 when the input search string 230 includes both the initial search query 210 and the further search query 212. More specifically, the threshold module 506 can pass the control flow to the location module 508 when the hiatus 228 is equal to or less than the threshold time 236. The threshold module 506 can be part of the first software 426, the second software 442, or a combination thereof. The first control unit 412 can execute the first software 426, the second control unit 434 can execute the second software 442, or a combination thereof to determine the threshold time 236 and compare the hiatus 228 with the threshold time 236. Moreover, the threshold module 506 can also communicate the threshold time 236 and the results of the comparison between devices through the first communication unit 416, the second communication unit 436, or a combination thereof.

The location module 508 is configured to determine the current location 242 of FIG. 2, the current heading 244 of FIG. 3, or a combination thereof. The location module 508 can use the location unit 420 of FIG. 4, the first communication unit 416, the second communication unit 436, or a combination thereof to determine the current location 242, the current heading 244, or a combination thereof.

For example, the location module 508 can determine the current location 242 by using a GPS component of the location unit 420 to determine the geographic coordinates of the first device 102. Also for example, the location module 508 can calculate and track the movement of the user to determine the geographic coordinates. As an additional example, the location module 508 can use an antenna component of the first communication unit 416 to determine the current location 242. Also, for example, the location module 508 can determine the current location 242 based on an input from a device in the navigation system 100 or the user 214.

The location module 508 can determine the current heading 244 by comparing the current location 242 with a previous location measurement obtained by the location unit 420. As an additional example, the location module 508 can determine the current heading 244 by using a compass component of the location unit 420. Also for example, the location module 508 can determine the current heading 244 using the GPS reading or a portion thereof from the location unit 420.

The location module 508 can store the current location 242, the current heading 244, or a combination thereof in the first storage unit 414, the second storage unit 446, or a combination thereof. The location module 508 can also use the first display interface 430, the second display interface 440, or a combination thereof to display the current location 242, the current heading 244, or a combination thereof.

The location module 508 can be part of the first software 426, the second software 442, or a combination thereof. The first control unit 412 can execute the first software 426, the second control unit 434 can execute the second software 442, or a combination thereof to determine the current location 242, the current heading 244, or a combination thereof.

Moreover, the location module 508 can also communicate the current location 242, the current heading 244, or a combination thereof between devices through the first communication unit 416, the second communication unit 436, or a combination thereof. After determining the current location 242, the current heading 244, or a combination thereof, the control flow can pass from the location module 508 to the context module 510.

The context module 510 is configured to determine the navigation context 302 of FIG. 3, the user preference 304 of FIG. 3, or a combination thereof. The context module 510 can determine the navigation context 302 associated with the initial search query 210, the further search query 212, or a combination thereof.

The navigation context 302 can include a day-of-the-week, a month, a weather condition, a traffic condition, or a combination thereof. The context module 510 can determine the day-of-the-week, the month, or a combination thereof by accessing a calendar or scheduling application on the first device 102, the second device 106, or a combination thereof.

The weather condition can include information or data concerning an atmospheric or weather-related phenomenon or occurrence in a geographic region or at a geographic location. The weather condition can include a temperature, a visibility level, a precipitation level, or a combination thereof. The context module 510 can determine the weather condition at the current location 242. In addition, the context module 510 can determine the weather condition in the geographic region or at the geographic location associated with the geographic identifier 220.

The traffic condition can include information or data concerning road closures, road conditions, accidents, or a combination thereof in a geographic region or at a geographic location. The context module 510 can determine the traffic condition by accessing a real-time traffic database, a crowd-sourced traffic database, or a combination thereof. Moreover, the context module 510 can determine the traffic condition based on historical traffic patterns. In addition, the context module 510 can determine the traffic condition by receiving or retrieving information concerning road closures, road conditions, accidents, or a combination thereof from another device in the navigation system 100.

The context module 510 is also configured to determine the user preference 304. The context module 510 can determine the user preference 304 for determining an inclination of the user 214 to visit one or more of the interest points 208 of FIG. 2. The context module 510 can determine the user preference 304 based on the travel profile 306 of FIG. 3, the user profile 308 of FIG. 3, or a combination thereof.

The context module 510 can determine the user preference 304 by generating the travel profile 306 associated with the user 214. The context module 510 can generate the travel profile 306 by accessing and ranking previous routes traversed by the user 214. In addition, the context module 510 can generate the travel profile 306 by accessing and ranking the interest points 208 frequented by the user 214.

The context module 510 can generate the travel profile 306 by receiving or retrieving locational data or information stored in a local or network storage device such as the first storage unit 414, the second storage unit 446, or a combination thereof. For example, the context module 510 can generate the travel profile 306 by retrieving locational data or information stored in a storage device coupled to the locational unit 420. The context module 510 can generate the travel profile 306 based on a time period predetermined by the navigation system 100 such as the past month, the past week, the past day, or the past few hours.

The context module 510 can generate the travel profile 306 by ranking the previous routes traversed by the user 214 or the interest points 208 frequented by the user 214. The context module 510 can determine the user preference 304 based on the ranking of the previous routes traversed by the user or the interest points 208 frequented by the user 214. For example, the context module 510 can determine the user preference 304 for a coffee shop based on a tendency of the user 214 to visit the coffee shop after work each day. As a more specific example, the context module 510 can determine the user preference 304 for the coffee shop based on the number of times the user 214 visited the coffee shop in a one month period.

The context module 510 can also determine the user preference 304 based on the user profile 308. The context module 510 can determine the user preference 304 by generating the user profile 308. The user profile 308 can include a user identity, a user demographic, a user-generated content, or a combination thereof.

The context module 510 can generate the user profile 308 by accessing data or information concerning the user identity, the user demographic, or a combination thereof stored in a local or network storage device such as the first storage unit 414, the second storage unit 446, or a combination thereof. In addition, the context module 510 can generate the user profile 308 based on data or information provided by the user 214.

The context module 510 can also generate the user profile 308 by accessing user-generated content concerning one or more of the interest points 208. The user-generated content can be stored in the first storage unit 414, the second storage unit 446, a storage unit outside of the navigation system 100, or a combination thereof.

The user-generated content can include a user-generated review, a user-generated commentary, a user photo, a calendar or itinerary entry attributed to the user 214 concerning one or more of the interest points 208, or a combination thereof. The context module 510 can generate the user profile 308 by receiving or retrieving the user-generated review, the user-generated commentary, or the user photo concerning one or more of the interest points 208 from an application server through an application programming interface (API).

The context module 510 can generate the user profile 308 based on a time period predetermined by the navigation system 100 such as the past month, the past week, the past day, or the past few hours. The context module 510 can also rank the interest points 208 included in the user profile 308 based on a user rating level or keywords or phrases included in the user commentary.

The context module 510 can determine the user preference 304 based on the ranking of the interest points 208 included in the user profile 308. The context module 510 can also determine the user preference 304 based on the number times a particular instance of the interest points 208 is mentioned in the user-generated content of the user profile 308. For example, the context module 510 can determine the user preference 304 for a pizzeria based on a favorable review of the pizzeria made by the user 214.

The context module 510 can be part of the first software 426, the second software 442, or a combination thereof. The first control unit 412 can execute the first software 426, the second control unit 434 can execute the second software 442, or a combination thereof to determine the navigation context 302, the user preference 304, or a combination thereof.

Moreover, the context module 510 can also communicate the navigation context 302, the user preference 304, or a combination thereof between devices through the first communication unit 416, the second communication unit 436, or a combination thereof. After determining the navigation context 302, the user preference 304, or a combination thereof, the control flow can pass from the context module 510 to the synthesis module 512.

The synthesis module 512 is configured to generate the synthesized search query 232. The synthesis module 512 can generate the synthesized search query 232 for determining the interest point suggestion 204. The synthesis module 512 can generate the synthesized search query 232 based on the input search string 230, the initial search time 216, the further search time 218, the navigation context 302, the travel profile 306, the user profile 308, the current location 242, the current heading 244, or a combination thereof.

The synthesis module 512 can generate the synthesized search query 232 by adding one or more instances of the proximity indicator 222 to the input search string 230. The synthesis module 512 can also generate the synthesized search query 232 by changing the sequence 234 of FIG. 2 of the initial search query 210 and the further search query 212 included in the input search string 230.

The synthesis module 512 can add the proximity indicator 222 to the input search string 230 by adding a word such as "in," "near," or "at" to the input search string 230. The synthesis module 512 can change the sequence 234 of the initial search query 210 and the further search query 212 by changing a word or syntax order of the further search query 212 and the initial search query 210. The synthesis module 512 can add the proximity indicator 222 to the input search string 230 and change the sequence 234 of the further search query 212 and the initial search query 210 based on the current heading 244, the navigation context 302, the travel profile 306, or a combination thereof.

For example, the synthesis module 512 can receive the words "museum San Jose technology" as the input search string 230 from the threshold module 506. The synthesis module 512 can interact with the query module 502 to determine the words "San Jose" as the geographic identifier 220 and the words "museum" and "technology" as the interest identifier 224. The synthesis module 512 can also interact with the location module 508 to determine the current heading 244 of the first device 102 is in the direction of the city of San Jose, Calif.

The synthesis module 512 can add the proximity indicator 222 "in" between the words "museum" and "San Jose," based on the current heading 244 of the first device 102. The synthesis module 512 can add the proximity indicator 222 to the input search string 230 to prevent the navigation system 100 from searching for museums near the current location 242 of the user 214 or a device carried by the user 214. Moreover, the synthesis module 512 can change the sequence 234 of the input search string 230 by placing the word "technology" before the word "museum."

The synthesis module 512 can change the sequence 234 of the input search string 230 based on the navigation context 302 and the travel profile 306. The synthesis module 512 can interact with the context module 510 to determine the day-of-the-week representing the navigation context 302 as a Saturday. The context module 510 can also determine the user 214 has frequented museums in the city of San Jose on Saturdays in the past. Based on these determinations, the synthesis module 512 can determine the word "technology" as a name or type of a museum and change the sequence 234 of the input search string 230 to more accurately reflect the intention of the user 214.

The synthesis module 512 can also generate the synthesized search query 232 based on the current heading 244, the initial search time 216, the further search time 218, the user profile 308, or a combination thereof. For example, the synthesis module 512 can receive the words "drive home pizzeria" as the input search string 230 from the threshold module 506. The synthesis module 512 can interact with the query module 502 to determine the word "home" as the geographic identifier 220 and the word "pizzeria" as the interest identifier 224. The synthesis module 512 can also interact with the location module 508 to determine the current heading 244 of the first device 102 is in the direction of the home of the user 214.

Moreover, the synthesis module 512 can interact with the timing module 504 to determine the initial search time 216 and the further search time 218 as approximately 5:30 PM. The synthesis module 512 can then interact with the context module 510 to determine the user 214 has left work and is driving home.

The synthesis module 512 can also interact with the context module 510 to determine the user preference 304 for pizzerias near the home of the user 214 based on the user-generated content in the user profile 308. For example, the context module 510 can determine the user preference 304 for pizzerias near the home of the user 214 based on favorable online reviews by the user 214 concerning such pizzerias. In addition, the context module 510 can determine the user preference 304 for such pizzerias based on past restaurant reservations made by the user 214 through an online reservation portal.

Based on this example, the synthesis module 512 can generate the synthesized search query 232 as "pizzeria near home" by changing the sequence 234 of the input search string 230 and adding the proximity indicator 222 "near" in between the words "pizzeria" and "home." The synthesis module 512 can add the proximity indicator 222 to the input search string 230 to prevent the navigation system 100 from searching for pizzerias near the current location 242 of the user 214 or a device carried by the user 214.

The synthesis module 512 can also generate the synthesized search query 232 by overriding the initial search query 210 with the further search query 212. The synthesis module 512 can override the initial search query 210 with the further search query 212 when a word or phrase included in the further search query 212 cannot be combined in one search query with a word or phrase included in the further search query 212. The synthesis module 512 can override the initial search query 210 with the further search query 212 by replacing one or more words or phrases included in the initial search query 210 with words or phrases included in the further search query 212.

The synthesis module 512 can override the initial search query 210 with the further search query 212 when the geographic identifier 220 included in the initial search query 210 is located in an opposite direction from the geographic identifier 220 included in the further search query 212 relative to the current location 242 of the user 214. For example, the synthesis module 512 can receive the words "pizzeria San Francisco San Jose" as the input search string 230 from the threshold module 506.

The synthesis module 512 can interact with the query module 502 to determine the words "San Francisco" and "San Jose" are instances of the geographic identifier 220. The synthesis module 512 can also interact with the location module 508 to determine the current location 242 of the user 214 as south of the city of San Francisco and north of the city of San Jose.

In this example, the synthesis module 512 can replace the words "San Francisco" from the initial search query 210 with the words "San Jose" from the further search query 212 when the current heading 244, the user preference 304, the navigation context 302, or a combination thereof indicates the user 214 intends to override the geographic identifier 220 in the initial search query 210 with the geographic identifier 220 in the further search query 212. For example, the synthesis module 512 can generate the synthesized search query 232 by replacing the words "San Francisco" with the words "San Jose" when the current heading 244 of the user 214 is in the direction of the city of San Jose, Calif.

The synthesis module 512 can also generate the synthesized search query 232 based on the urgent term 226 and the current location 242. The synthesis module 512 can generate the synthesized search query 232 using the current location 242 when the query module 502 identifies the urgent term 226 in either the initial search query 210 or the further search query 212. For example, the synthesis module 512 can receive the words "museum San Jose bathroom" as the input search string 230 from the threshold module 506. The synthesis module 512 can interact with the query module 502 to determine the presence of the urgent term 226 "bathroom" in the further search query 212.

In this example, the synthesis module 512 can generate the synthesized search query 232 as "bathroom near current location" using the current location 242 of the user 214. The synthesis module 512 can generate the synthesized search query 232 using the urgent term 226 and the current location 242 regardless of the presence of other instances of the geographic identifier 220 and the interest identifier 224 in the initial search query 210 or the further search query 212.

After generating the synthesized search query 232, the synthesis module 512 can pass the control flow back to the query module 502. The synthesis module 512 can pass the control flow back to the query module 502 for the query module 502 to use the synthesized search query 232 as a new instance of the initial search query 210.

As an example, the synthesized search query 232 can pass the control flow back to the query module 502 after generating the synthesized search query 232 "find technology museum in San Jose." In this example, the query module 502 can identify "find technology museum in San Jose" as the initial search query 210 and identify a subsequent query as the further search query 212.

Continuing with the above example, the query module 502 can identify the initial search query 210 as the phrase "find technology museum in San Jose" and identify the further search query 212 as the word "café." In this example, the synthesis module 512 can generate a new instance of the synthesized search query 232 as "find café near technology museum in San Jose."

The synthesis module 512 can be part of the first software 426, the second software 442, or a combination thereof. The first control unit 412 can execute the first software 426, the second control unit 434 can execute the second software 442, or a combination thereof to generate the synthesized search query 232.

Moreover, the synthesis module 512 can also communicate the synthesized search query 232 between devices through the first communication unit 416 including the first communication interface 428 of FIG. 4, the second communication unit 436 including the second communication interface 450 of FIG. 4, or a combination thereof. After generating the synthesized search query 232, the control flow can also pass from the synthesis module 512 to the search module 514.

The navigation system 100 can pass the control flow to the query module 502 when the further search query 212 does not result in any meaningful response or when the confidence score of speech-to-text output is low as predetermined by the navigation system 100. The query module 502, the threshold module 506, or a combination thereof can adjust the timing logic and process the initial search query 210 along with a subsequent query following the further search query 212. The query module 502, the threshold module 506, or a combination thereof can adjust the timing logic to account for the additional time elapsed due to the further search query 212.

The search module 514 is configured to generate the interest point suggestion 204. The search module 514 can generate the interest point suggestion 204 for satisfying or fulfilling the synthesized search query 232. The search module 514 can generate the interest point suggestion 204 in a number of ways.

The search module 514 can generate the interest point suggestion 204 based on the geographic identifier 220 and the synthesized search query 232. The search module 514 can generate the interest point suggestion 204 by searching a dataset or index using the geographic identifier 220 and the synthesized search query 232.

The search module 514 can generate the interest point suggestion 204 by filtering a map dataset, a POI dataset, or a combination thereof using the geographic identifier 220. The search module 514 can then search the remaining portions of the map dataset, the POI dataset, or a combination thereof using keywords or phrases included in the synthesized search query 232. For example, the search module 514 can generate the interest point suggestion 204 by filtering an OPENSTREAMMAP™ dataset using the geographic identifier 220. The search module 514 can then search the filtered portions of the OPENSTREETMAP™ dataset for set entries matching the keywords or phrases included in the synthesized search query 232.

The search module 514 can generate the interest point suggestion 204 by searching a geo-index such as a map data tree, a spatial data tree, or a combination thereof for the interest points 208 matching the geographic identifier 220 and the synthesized search query 232. For example, the search module 514 can use a quad tree algorithm, a Kd-tree algorithm, or a combination thereof to search the geo-index for the interest points 208 in the geographic identifier 220 and matching the synthesized search query 232.

The search module 514 can also generate the interest point suggestion 204 based on the synthesized search query 232 and the user preference 304. The search module 514 can generate the interest point suggestion 204 by searching the interest points 208 included in the travel profile 306, the user profile 308, or a combination thereof using search terms included in the synthesized search query 232.

The search module 514 can store the interest point suggestion 204 in the first storage unit 414, the second storage unit 446, or a combination thereof. The search module 514 can also use the first display interface 430, the second display interface 440, or a combination thereof to display the interest point suggestion 204.

The search module 514 can be part of the first software 426, the second software 442, or a combination thereof. The first control unit 412 can execute the first software 426, the second control unit 434 can execute the second software 442, or a combination thereof to generate the interest point suggestion 204.

Moreover, the search module 514 can also communicate the interest point suggestion 204 between devices through the first communication unit 416, the second communication unit 436, or a combination thereof. After generating the interest point suggestion 204, the control flow can pass from the search module 514 to the route module 516.

The route module 516 is configured to calculate the navigation routes 238 of FIG. 2. The route module 516 can calculate the navigation routes 238 for reaching the interest point suggestion 204 from the starting location 240 of FIG. 2. The route module 516 can receive the starting location 240 from the user 214 or a device in the navigation system 100 such as the first device 102, the second device 106, or a combination thereof.

For example, the route module 516 can calculate the navigation routes 238 for guiding the first device 102 from the current location 242 to the interest point suggestion 204. The route module 516 can calculate the navigation routes 238 using a tree traversal mechanism, a graph traversal mechanism, or a combination thereof. As a more specific example, the route module 516 can calculate the navigation routes 238 using a Dijkstra's algorithm, a Bellman-Ford algorithm, an A-star algorithm, a bidirectional algorithm, a Floyd-Warshall algorithm, an iterative deepening algorithm, a shortest path algorithm, or a combination thereof.

The route module 516 can store the navigation routes 238 in the first storage unit 414, the second storage unit 446, or a combination thereof. The route module 516 can also use the first display interface 430, the second display interface 440, or a combination thereof to display one or more of the navigation routes 238.

The route module 516 can be part of the first software 426, the second software 442, or a combination thereof. The first control unit 412 can execute the first software 426, the second control unit 434 can execute the second software 442, or a combination thereof to calculate the navigation routes 238. Moreover, the route module 516 can also communicate the navigation routes 238 between devices through the first communication unit 416, the second communication unit 436, or a combination thereof.

The physical transformation of the navigation system 100 generating the synthesized search query 232 based on the initial search query 210, the further search query 212, and the hiatus 228 results in movement in the physical world, such as people using the first device 102 to locate addresses, POIs, or routes using the navigation system 100. As the movement in the physical world occurs, the movement itself creates additional information that is converted back into locational information that is displayable on the display interface 202 for the continued operation of the navigation system 100 and to continued movement in the physical world.

It has been discovered that generating the synthesized search query 232 based on the initial search query 210, the further search query 212, and the hiatus 228 improves the safety of the navigation system 100 by reducing the amount and the length of interactions between the user 214 and the navigation system 100 when conducting the navigation search 206. The navigation system 100 can reduce the amount and the length of interactions between the user 214 and the navigation system 100 by generating a composite query in the form of the synthesized search query 232. The navigation system 100 can automatically generate the synthesized search query 232 based on the initial search query 210 and the further search query 212 rather than the user 214 having to manually enter a long complicated query or continuously revise previous queries through repeated interactions with the navigation system 100.

It has further been discovered that generating the synthesized search query 232 based on the initial search query 210, the further search query 212, and the hiatus 228 provides for an improved search experience over time as the navigation system 100 can learn from previous instances of the synthesized search query 232. In addition, the navigation system 100 can use the synthesized search query 232 as a new instance of the initial search query 210 and can quickly conduct new searches based on information gathered from previous searches.

It has been discovered that generating the synthesized search query 232 based on the travel profile 306, the user profile 308, the initial search query 210, the further search query 212, or a combination thereof provides for a more personalized search experience. By taking into account the previous routes or POIs frequented by the user 214, the navigation system 100 can generate the synthesized search query 232, the interest point suggestion 204, or a combination thereof to more accurately reflect the user preference 304 for certain routes or POIs.

It has been discovered that generating the synthesized search query 232 based on the current location 242 and the urgent term 226 provides for a more responsive navigation system 100. After identifying the urgent term 226 in the initial search query 210, the further search query 212, or a combination thereof, the navigation system 100 can focus the navigation search 206 on addressing the immediate needs of the user 214 in a more efficient manner.

The modules described in this application can be ordered or partitioned differently. For example, certain modules can be combined. Each of the modules can also operate individually and independently of the other modules. Furthermore, data generated in one module can be used by another module without being directly coupled to each other.

The modules described in this application can be implemented by hardware circuitry or hardware acceleration units (not shown) in the control units. The modules described in this application can also be implemented by separate hardware units (not shown), including hardware circuitry, outside the control units but with the first device 102 or the second device 106.

For illustrative purposes, the various modules have been described as being specific to the first device 102, the second device 106, or a combination thereof. However, it is understood that the modules can be distributed differently. For example, the various modules can be implemented in a different device, or the functionalities of the modules can be distributed across multiple devices.

The modules described in this application can be implemented as instructions stored on a non-transitory computer readable medium to be executed by a first control unit 412, the second control unit 434, or a combination thereof. The non-transitory computer medium can include the first storage unit 414, the second storage unit 446, or a combination thereof. The first storage unit 414, the second storage unit 446, or a combination thereof, or a portion therein can also be made removable from the first device 102, the second device 106, or a combination thereof.

The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

As a more specific example, one or more modules described above can be stored in the non-transitory memory medium for distribution to a different system, a different device, a different user, or a combination thereof. Also as a more specific example, the modules described above can be implemented or stored using a single hardware unit, such as a chip or a processor, or across multiple hardware units.

Figure 6:
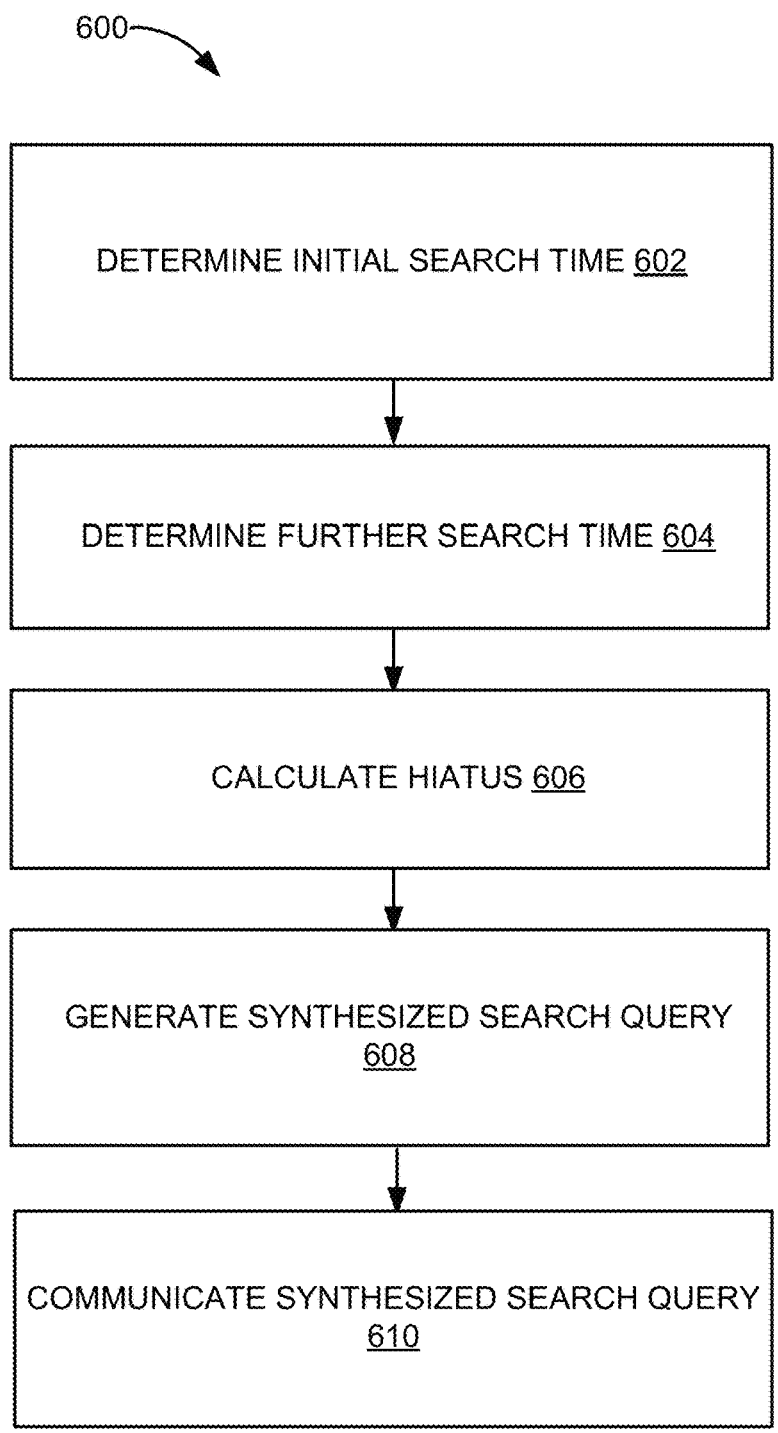
FIG. 6 is a flow chart of a method of operation of the navigation system in a further embodiment of the present invention.

Referring now to FIG. 6, therein is shown a flow chart of a method 600 of operation of the navigation system 100 of FIG. 1 in a further embodiment of the present invention. The method 600 includes determining, with the control unit 412 of FIG. 4, the initial search time 216 of FIG. 2 associated with the initial search query 210 of FIG. 2 for commencing the navigation search 206 of FIG. 2 in a block 602. The method 600 also includes determining the further search time 218 of FIG. 2 associated with the further search query 212 of FIG. 2 for modifying the navigation search 206 in a block 604.

The method 600 further includes calculating the hiatus 228 of FIG. 2 between the further search time 218 and the initial search time 216 in a block 606. The method 600 also includes generating the synthesized search query 232 of FIG. 2 based on the initial search query 210, the further search query 212, and the hiatus 228 in a block 608. The method 600 further includes communicating, with the communication interface 428 of FIG. 4 coupled to the control unit 412, the synthesized search query 232 in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A navigation system comprising:
   a control unit configured to:
      determine an initial search time associated with an initial search query with a timestamp indicating when a first byte of an audio sample for the initial search query was generated for commencing a navigation search;
      determine a further search time associated with a further search query with a different timestamp indicating when a different first byte of a different audio sample for the further search query was generated for modifying the navigation search wherein the timestamp is used to avoid a jitter based on timing variations between when a signal was generated versus when the signal was received;
      calculate a hiatus by calculating a time elapsed between the further search time and the initial search time;
      modify the initial search query dynamically and in real-time by adding a proximity indicator based on a current heading representing a real-time geodetic direction of motion;
      determining a navigation context by accessing traffic information in real-time for receiving the traffic information from another device distributed across different geographical locations;
      generate a synthesized search query based on the initial search query, the further search query, the hiatus, and the navigation context; and
   a communication interface, coupled to the control unit, configured to communicate the synthesized search query.

2. The system as claimed in claim 1 wherein the control unit is further configured to:
   determine the navigation context associated with the initial search query, the further search query, or a combination thereof; and generate the synthesized search query based on the initial search query, the further search query, and the navigation context.

3. The system as claimed in claim 1 wherein the control unit is further configured to:
determine a threshold time for evaluating the hiatus; and
generate an input search string based on the initial search query, the further search query, or a combination thereof by comparing the hiatus with the threshold time; and
generate the synthesized search query based on the input search string.

4. The system as claimed in claim 1 wherein the control unit is further configured to:
generate a user profile for determining a user preference for one or more interest points; and
generate the synthesized search query based on the user profile, the user preference, the initial search query, the further search query, or a combination thereof.

5. The system as claimed in claim 1 wherein the control unit is further configured to:
determine a current location;
identify an urgent term from the initial search query, the further search query, or a combination thereof; and
generate the synthesized search query based on the current location and the urgent term.

6. The system as claimed in claim 1 wherein the control unit is further configured to generate an interest point suggestion based on the synthesized search query.

7. The system as claimed in claim 1 wherein the control unit is further configured to generate the synthesized search query by overriding the initial search query with the further search query.

8. The system as claimed in claim 1 wherein the control unit is further configured to:
generate a travel profile for determining a user preference for one or more interest points; and
generate the synthesized search query based on the travel profile, the user preference, the initial search query, the further search query, or a combination thereof.

9. The system as claimed in claim 1 wherein the control unit is further configured to generate the synthesized search query by changing a sequence of the initial search query and the further search query.

10. The system as claimed in claim 1 wherein the control unit is further configured to calculate one or more navigation routes based on the synthesized search query and a starting location.

11. A method of operation of a navigation system comprising:
determining, with a control unit, an initial search time associated with an initial search query with a timestamp indicating when a first byte of an audio sample for the initial search query was generated for commencing a navigation search;
determining a further search time associated with a further search query with a different timestamp indicating when a different first byte of a different audio sample for the further search query was generated for modifying the navigation search wherein the timestamp is used to avoid a jitter based on timing variations between when a signal was generated versus when the signal was received;
calculating a hiatus by calculating a time elapsed between the further search time and the initial search time;

modifying the initial search query dynamically and in real-time by adding a proximity indicator based on a current heading representing a real-time geodetic direction of motion;
determining a navigation context by accessing traffic information in real-time for receiving the traffic information from another device distributed across different geographical locations;
generating a synthesized search query based on the initial search query, the further search query, the hiatus, and the navigation context; and
communicating, with a communication interface coupled to the control unit, the synthesized search query.

12. The method as claimed in claim 11 further comprising:
determining the navigation context associated with the initial search query, the further search query, or a combination thereof; and
generating the synthesized search query based on the initial search query, the further search query, and the navigation context.

13. The method as claimed in claim 11 further comprising:
determining a threshold time for evaluating the hiatus; and
generating an input search string based on the initial search query, the further search query, or a combination thereof by comparing the hiatus with the threshold time; and
generating the synthesized search query based on the input search string.

14. The method as claimed in claim 11 further comprising:
generating a user profile for determining a user preference for one or more interest points; and
generating the synthesized search query based on the user profile, the user preference, the initial search query, the further search query, or a combination thereof.

15. The method as claimed in claim 11 further comprising:
determining a current location;
identifying an urgent term from the initial search query, the further search query, or a combination thereof; and
generating the synthesized search query based on the current location and the urgent term.

16. A non-transitory computer readable medium including instructions for execution, comprising:
determining an initial search time associated with an initial search query with a timestamp indicating when a first byte of an audio sample for the initial search query was generated for commencing a navigation search;
determining a further search time associated with a further search query with a different timestamp indicating when a different first byte of a different audio sample for the further search query was generated for modifying the navigation search wherein the timestamp is used to avoid a jitter based on timing variations between when a signal was generated versus when the signal was received;
calculating a hiatus by calculating a time elapsed between the further search time and the initial search time;
modifying the initial search query dynamically and in real-time by adding a proximity indicator based on a current heading representing a real-time geodetic direction of motion;

determining a navigation context by accessing traffic information in real-time for receiving the traffic information from another device distributed across different geographical locations;

generating a synthesized search query based on the initial search query, the further search query, the hiatus, and the navigation context; and communicating the synthesized search query.

17. The non-transitory computer readable medium as claimed in claim 16 further comprising:

determining the navigation context associated with the initial search query, the further search query, or a combination thereof, and generating the synthesized search query based on the initial search query, the further search query, and the navigation context.

18. The non-transitory computer readable medium as claimed in claim 16 further comprising:

determining a threshold time for evaluating the hiatus; and generating an input search string based on the initial search query, the further search query, or a combination thereof by comparing the hiatus with the threshold time; and generating the synthesized search query based on the input search string.

19. The non-transitory computer readable medium as claimed in claim 16 further comprising:

generating a user profile for determining a user preference for one or more interest points; and generating the synthesized search query based on the user profile, the user preference, the initial search query, the further search query, or a combination thereof.

20. The non-transitory computer readable medium as claimed in claim 16 further comprising determining a current location;

identifying an urgent term from the initial search query, the further search query, or a combination thereof; and generating the synthesized search query based on the current location and the urgent term.

* * * * *